United States Patent
Oishi

(10) Patent No.: US 11,481,226 B2
(45) Date of Patent: Oct. 25, 2022

(54) CONTROL APPARATUS AND RESET METHOD OF CONTROL APPARATUS

(71) Applicant: TOYOTA JIDOSHA KABUSHIKI KAISHA, Toyota (JP)

(72) Inventor: Makoto Oishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 16/748,102

(22) Filed: Jan. 21, 2020

(65) Prior Publication Data
US 2020/0272481 A1    Aug. 27, 2020

(30) Foreign Application Priority Data

Feb. 25, 2019  (JP) .............................. JP2019-031814

(51) Int. Cl.
| | | |
|---|---|---|
| *G06F 9/00* | (2006.01) | |
| *G06F 9/4401* | (2018.01) | |
| *G06F 11/30* | (2006.01) | |
| *G06F 11/07* | (2006.01) | |

(52) U.S. Cl.
CPC ........ *G06F 9/4405* (2013.01); *G06F 11/0757* (2013.01); *G06F 11/3082* (2013.01); *G06F 11/3096* (2013.01); *G06F 9/4401* (2013.01); *G06F 9/4406* (2013.01)

(58) Field of Classification Search
CPC .............. G06F 9/4405; G06F 11/0757; G06F 11/3082; G06F 11/3096; G06F 11/0721; G06F 11/3072; G06F 11/1438

USPC ........................................................ 713/2
See application file for complete search history.

(56) References Cited

U.S. PATENT DOCUMENTS

| | | | | |
|---|---|---|---|---|
| 6,820,000 B2* | 11/2004 | Miyano | ................... | G05B 9/02 |
| | | | | 701/115 |
| 8,155,824 B2* | 4/2012 | Sakai | ................ | B60W 50/0205 |
| | | | | 701/29.2 |
| 8,165,743 B2* | 4/2012 | Oyama | ................... | B60L 50/61 |
| | | | | 701/99 |
| 8,228,009 B2* | 7/2012 | Purcell | ..................... | H02P 5/52 |
| | | | | 318/34 |

(Continued)

FOREIGN PATENT DOCUMENTS

| | | |
|---|---|---|
| JP | 01-298446 A | 12/1989 |
| JP | 2012-006535 A | 1/2012 |
| JP | 6081239 B2 | 2/2017 |

*Primary Examiner* — Volvick Derose
(74) *Attorney, Agent, or Firm* — Sughrue Mion, PLLC

(57) ABSTRACT

A first and a second control modules of a control apparatus of the present disclosure mutually monitor a state of the other end and send a reset request signal to a monitoring module when the other end should be reset. The monitoring module sends a reset signal to one of the first and second control modules when the monitoring module receives the reset request signal indicating that the one of the first and second control modules should be reset from the other and the monitoring module does not send the reset signal to the other. The monitoring module prohibits a reset of one of the first and second control modules when the monitoring module receives the reset request signal indicating that the one of the first and second control modules should be reset from the other and the monitoring module sends the reset signal to the other.

9 Claims, 5 Drawing Sheets

(56) References Cited

U.S. PATENT DOCUMENTS

| | | | | |
|---|---|---|---|---|
| 8,633,667 B2* | 1/2014 | Watanabe | ............. | B60W 10/00 |
| | | | | 318/605 |
| 9,121,361 B2* | 9/2015 | Shimizu | ................ | F02D 41/221 |
| 10,040,447 B2* | 8/2018 | Reynolds | .............. | B60W 20/50 |
| 2001/0027537 A1* | 10/2001 | Nada | ....................... | B60K 6/547 |
| | | | | 903/947 |
| 2014/0184122 A1* | 7/2014 | Ogawa | .................. | E02F 9/2095 |
| | | | | 318/461 |
| 2018/0047327 A1* | 2/2018 | Wang | ................... | G11C 19/184 |
| 2022/0055663 A1* | 2/2022 | Buehler | ................ | B60W 10/20 |

\* cited by examiner

| OUTPUT LEVEL OF 1st ABNOR DET | OUTPUT LEVEL OF 2nd RSET PROC | OUTPUT LEVEL OF 1st RSET REQ DET | OUTPUT LEVEL OF 1st RSET PROC |
|---|---|---|---|
| Lo | Lo | Lo | Lo |
| Lo | Lo | Hi | Lo |
| Lo | Hi | Lo | Lo |
| Lo | Hi | Hi | Lo |
| Hi | Lo | Lo | Hi |
| Hi | Lo | Hi | Hi |
| Hi | Hi | Lo | Hi |
| Hi | Hi | Hi | Lo |
| Hi: NORMAL Lo: ABNORMAL | Hi: RESET PROHIBITED Lo: RESET | Hi: RSET REQ Lo: RSET NOT REQ | Hi: RESET PROHIBITED Lo: RESET |

FIG. 6

| OUTPUT LEVEL OF 2nd ABNOR DET | OUTPUT LEVEL OF 1st RSET PROC | OUTPUT LEVEL OF 2nd RSET REQ DET | OUTPUT LEVEL OF 2nd RSET PROC |
|---|---|---|---|
| Lo | Lo | Lo | Lo |
| Lo | Lo | Hi | Lo |
| Lo | Hi | Lo | Lo |
| Lo | Hi | Hi | Lo |
| Hi | Lo | Lo | Hi |
| Hi | Lo | Hi | Hi |
| Hi | Hi | Lo | Hi |
| Hi | Hi | Hi | Lo |
| Hi: NORMAL Lo: ABNORMAL | Hi: RESET PROHIBITED Lo: RESET | Hi: RSET REQ Lo: RSET NOT REQ | Hi: RESET PROHIBITED Lo: RESET |

FIG. 7

CONTROL APPARATUS AND RESET METHOD OF CONTROL APPARATUS

CROSS-REFERENCE TO RELATED APPLICATION

The present disclosure claims priority to Japanese Patent Application No. 2019-031814 filed on Feb. 25, 2019, which is incorporated herein by reference in its entirety including specification, drawings and claims.

TECHNICAL FIELD

The present disclosure relates to a control apparatus that includes a first control module configured to control a first equipment, a second control module configured to control the first equipment or a second equipment different from the first equipment, and a monitoring module configured to monitor the first and second control modules, and to a reset method of the control apparatus.

BACKGROUND

A conventionally known control apparatus includes a sub-microcomputer with a function of outputting a trigger signal, a main microcomputer triggered by the trigger signal so as to perform a specific computation processing and send an computation result to the sub-microcomputer, and a watchdog timer (computer monitoring means) to which the trigger signal is input (as described in, for example, Japanese Patent No. 6081239). In the control apparatus, the sub-microcomputer monitors a state of the main microcomputer based on the computation result from the main microcomputer and outputs a reset signal so as to reset the main microcomputer when the computation result is abnormal. The watchdog timer resets both the sub-microcomputer and the main microcomputer when a cycle of the trigger signal from the sub-microcomputer is not within a normal range. Further, the main microcomputer terminates its operation when the cycle of the trigger signal from the sub-microcomputer is not within the normal range.

A conventionally known double microcomputer system includes first and second microcomputers (CPUs) respectively storing the same program and controlling a common control target in accordance with separate clock sources of substantially the same clock speed, a first watchdog pulse cutoff circuit, a first watchdog timer circuit, a second watchdog pulse cutoff circuit, and a second watchdog timer circuit (as described in, for example, Japanese Patent No. 2593915). The first watchdog timer circuit of the double microcomputer system monitors watchdog pulses from the first microcomputer. The second watchdog timer circuit monitors watchdog pulses from the second microcomputer. Further, the first watchdog pulse cutoff circuit cuts off a supply of the watchdog pulses from the first microcomputer to the first watchdog timer circuit in response to a watchdog test signal from the second microcomputer. The second watchdog pulse cutoff circuit cuts off a supply of the watchdog pulses from the second microcomputer to the second watchdog timer circuit in response to a watchdog test signal from the first microcomputer. Each of the first and second watchdog timer circuits outputs a reset signal to the first or second microcomputer when the supply of the watchdog pulses from the first or second microcomputer is cut off.

SUMMARY

However, in the control apparatus disclosed in Japanese Patent No. 6081239, the main microcomputer may be reset due to a malfunction of the sub-microcomputer even though it operates normally when an abnormality occurs in the sub-microcomputer. Further, when one of the first and second microcomputers of the double microcomputer system disclosed in Japanese Patent No. 2593915 normally operates and an abnormality occurs in the other, the normally operating one of the first and second microcomputers may be reset in response to the watchdog test signal erroneously output from the other of the first and second microcomputers.

A main object of the present disclosure is to suppress a normal one of first and second control modules included in a control apparatus to be reset when the one of the first and second control modules normally operates and an abnormality occurs in the other.

A control apparatus of the present disclosure includes a first control module configured to control a first equipment, a second control module configured to control the first equipment or a second equipment different from the first equipment, and a monitoring module configured to monitor the first and second control modules and to send a reset signal to each of the first and second control modules. The first and second control modules mutually monitor a state of the other end and send a reset request signal to the monitoring module when the other end should be reset. The monitoring module sends the reset signal to one of the first and second control modules when the monitoring module receives the reset request signal indicating that the one of the first and second control modules should be reset from the other of the first and second control modules and the monitoring module does not send the reset signal to the other of the first and second control modules. The monitoring module prohibits a reset of one of the first and second control modules when the monitoring module receives the reset request signal indicating that the one of the first and second control modules should be reset from the other of the first and second control modules and the monitoring module sends the reset signal to the other of the first and second control modules.

BRIEF DESCRIPTION OF DRAWINGS

FIG. 6 shows a truth table of a logic circuit that configures a first reset processing module of the monitoring module shown in FIG. 5; and FIG. 7 shows a truth table of a logic circuit that configures a second reset processing module of the monitoring module shown in FIG. 5.

DESCRIPTION OF EMBODIMENTS

The following describes some embodiments of the disclosure with reference to drawings.

Figure 1:
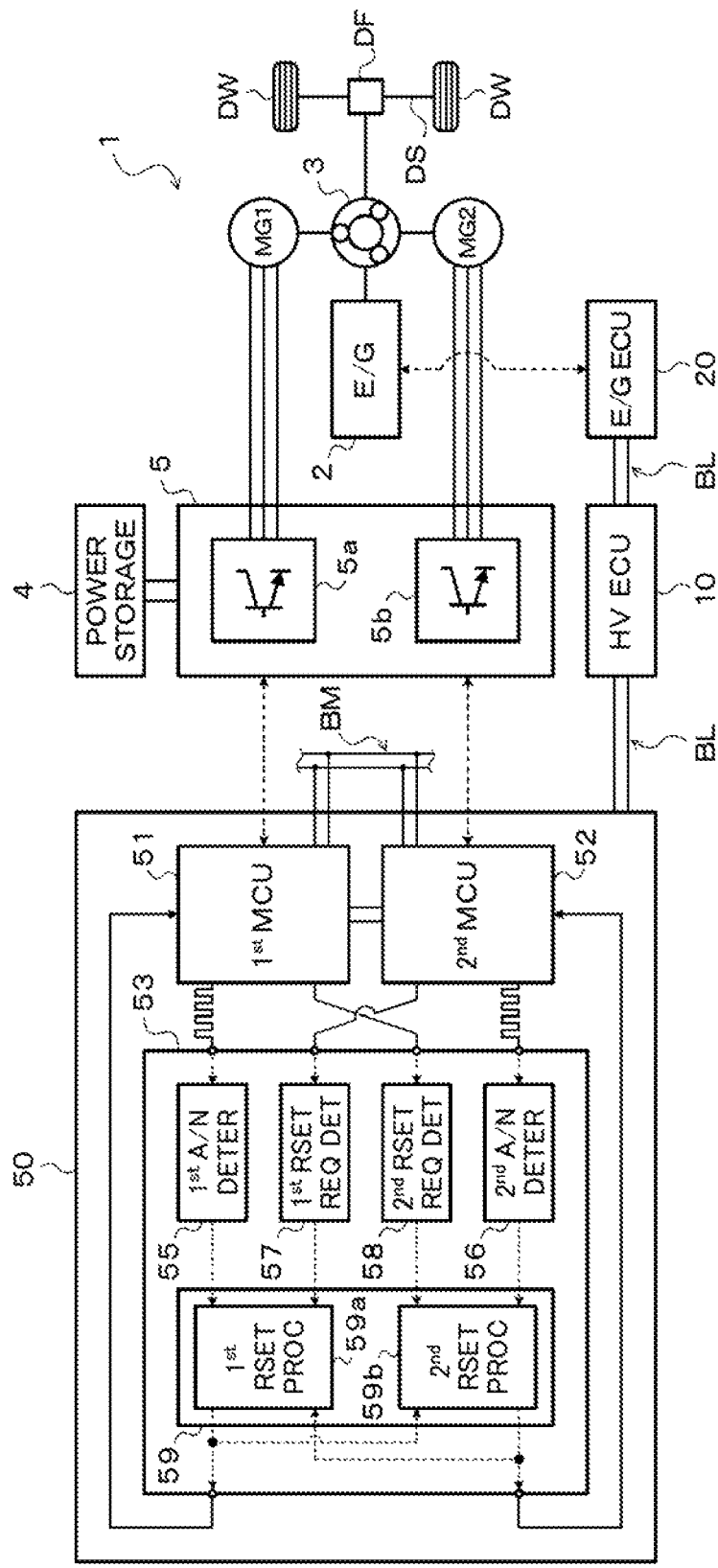
FIG. 1 is a schematic configuration diagram illustrating a vehicle with the control apparatus according to the present disclosure.

FIG. 1 is a schematic configuration diagram illustrating a vehicle 1 that includes a motor electronic control unit (hereinafter referred to as "MGECU") 50 or the control apparatus according to the present disclosure. The vehicle 1 shown in FIG. 1 includes an engine 2, a motor generator MG1 mainly operated as a generator, a motor generator MG2 mainly outputting a driving power and a regenerative braking force, a single pinion planetary gear 3, a power storage device (battery) 4, a power control unit (PCU) 5 connected to the power storage device 4 and configured to drive the motor generators MG1 and MG2, and a hybrid electronic control unit (hereinafter referred to as "HVECU") 10 configured to control the entire vehicle 1.

The engine 2 is an internal combustion engine configured to generate power by explosive combustion of a mixture of a hydrocarbon fuel and the air. The engine 2 is controlled by an engine electronic control unit (hereinafter referred to as "engine ECU") 20. The motor generators MG1 and MG2 are respectively configured as a synchronous motor generator (three-phase AC motor). The planetary gear 3 includes a sun gear coupled to the motor generator MG1 (rotor), a ring gear connected to an output shaft and coupled to the motor generator MG2 (rotor), and a planet carrier that rotatably supports a plurality of pinion gears and is coupled to a crankshaft of the engine 2. The output shaft is coupled to left and right drive wheels DW via a differential gear DF and drive shafts DS. The power storage device 4 is, for example, a lithium ion secondary battery or a nickel hydrogen secondary battery. The power control unit 5 includes a first inverter 5a configured to drive the motor generator MG1, a second inverter 5b configured to drive the motor generator MG2, a boost converter (not shown) and the like. The power control unit 5 is controlled by the MGECU 50.

As shown in the figure, the HVECU 10, the engine ECU 20 and the MGECU 50 are respectively connected to a common communication line (multiplex communication bus) BM that is a CAN bus including two communication lines (wire harnesses) of Lo and Hi, and exchanges information (communication frame) each other via the common communication line BM by CAN communication. The MGECU 50 (same in the engine ECU 20) is individually connected to the HVECU 10 via a dedicated communication line (local communication bus) BL which is a CAN bus including two communication lines (wire harnesses) of Lo and Hi. The MGECU 50 exchanges information (communication frame) with the HVECU 10 via the dedicated communication line BL.

The MGECU 50 is configured to control the power control unit 5 in cooperation with the HVECU 10 and the engine ECU 20. As shown in FIG. 1, the MGECU 50 includes a first microcomputer 51 as a first control module that controls the first inverter 5a corresponding to the motor generator MG1 (first equipment), a second microcomputer 52 as a second control module that controls the second inverter 5b corresponding to the motor generator MG2 (second equipment), the boost converter (not shown) and the like, and a monitoring unit (monitoring module) 53 that monitors the first and second microcomputers 51 and 52.

The first microcomputer 51 of the MGECU 50 includes a first CPU, a ROM, a RAM, an input-output interface, various drive circuits, various logic ICs and the like (not shown). Further, the second microcomputer 52 includes a second CPU, a ROM, a RAM, an input-output interface, various drive circuits, various logic ICs and the like (not shown). The first microcomputer 51 (first CPU) and the second microcomputer 52 (second CPU) are respectively connected to the common communication line BM and the dedicated communication line BL. The first and second microcomputers 51 and 52 are connected to each other via a first signal line for sending signals from the first microcomputer 51 to the second microcomputer 52 and a second signal line for sending signals from the second microcomputer 52 to the first microcomputer 51. The first and second microcomputers 51 and 52 exchange information with each other via the first and second signal lines. Further, the first microcomputer 51 is connected to the monitoring unit 53 via a first pulse signal line and a first reset request signal line. The second microcomputer 52 is connected to the monitoring unit 53 via a second pulse signal line and a second reset request signal line. The first microcomputer 51 sends a watchdog pulse signal (run pulse signal) to the monitoring unit 53 via the first pulse signal line and the second microcomputer 52 sends a watchdog pulse signal (run pulse signal) to the monitoring unit 53 via the second pulse signal line.

The first microcomputer 51 determines whether or not an abnormality has occurred in the second microcomputer 52 based on a part of the information (for example, computation result or the like) sent from the second microcomputer 52 via the second signal line. When determining that the abnormality occurs in the second microcomputer 52, the first microcomputer 51 sends a reset request signal indicating that the second microcomputer 52 should be reset to the monitoring unit 53 via the first reset request signal line. Further, the second microcomputer 52 determines whether or not an abnormality has occurred in the first microcomputer 51 based on a part of the information (for example, computation result or the like) sent from the first microcomputer 51 via the first signal line. When determining that the abnormality occurs in the first microcomputer 51, the second microcomputer 52 sends a reset request signal indicating that the first microcomputer 51 should be reset to the monitoring unit 53 via the second reset request signal line. That is, the first and second microcomputers 51 and 52 mutually monitor a state of the other end and sends the reset request signal to the monitoring unit 53 when the other end should be reset.

In the present embodiment, the monitoring unit 53 is a single microcomputer (third microcomputer) that includes a third CPU, a ROM, a RAM, an input-output interface, various logic ICs and the like (not shown). As shown in FIG. 1, a monitoring unit 53 includes a first abnormality determining module 55, a second abnormality determining module 56, a first reset request determining module 57, a second reset request determining module 58 and a reset processing module 59 as functional blocks (modules) constructed by cooperation of hardware such as the third CPU, the ROM, the RAM, the logic ICs, etc. and software such as various programs installed in the ROM.

The first abnormality determining module 55 is a watchdog counter connected to the first microcomputer 51 via the first pulse signal line. The first abnormality determining module 55 determines whether or not the abnormality occurs in the first microcomputer 51 based on the watchdog pulse signal from the first microcomputer 51. That is, the first abnormality determining module 55 monitors the watchdog pulse signal from the first microcomputer 51 and sets a first watchdog monitoring flag Fw1 to Hi (high) level when it determines that the watchdog pulse signal from the first microcomputer 51 is not interrupted for a predetermined time or more and no abnormality occurs in the first microcomputer 51. Further, the first abnormality determining module 55 sets the first watchdog monitoring flag Fw1 to Lo (low) level when it determines that the watchdog pulse signal from the first microcomputer 51 is interrupted for the predetermined time or more and the abnormality occurs in the first microcomputer 51.

The second abnormality determining module 56 is a watchdog counter connected to the second microcomputer 52 via the second pulse signal line. The second abnormality determining module 56 determines whether or not the abnormality occurs in the second microcomputer 52 based on the watchdog pulse signal from the second microcomputer 52. That is, the second abnormality determining module 56 monitors the watchdog pulse signal from the second microcomputer 52 and sets a second watchdog monitoring flag Fw2 to Hi level when it determines that the watchdog pulse signal from the second microcomputer 52 is not interrupted for the predetermined time or more and no abnormality occurs in the second microcomputer 52. Further, the second abnormality determining module 56 sets the second watchdog monitoring flag Fw2 to Lo level when it determines that the watchdog pulse signal from the second microcomputer 52 is interrupted for the predetermined time or more and the abnormality occurs in the second microcomputer 52. The first and second abnormality determining modules 55 and 56 are not limited to the above-described timeout type watchdog counter. The first and second abnormality determining modules 55 and 56 may be either a window type watchdog counter or a period monitoring type watchdog counter.

The first reset request determining module 57 is connected to the second microcomputer 52 via the above second reset request signal line and determines whether or not the reset request signal indicating that the first microcomputer 51 should be reset is sent to the monitoring unit 53 from the second microcomputer 52. The first reset request determining module 57 sets a first reset request flag Frq1 to Lo level when it determines that a format of the signal sent from the second microcomputer 52 via the second reset request signal line does not match a predetermined reset request format and the reset request signal is not sent from the second microcomputer 52. When the format of the signal sent from the second microcomputer 52 matches the reset request format, the first reset request determining module 57 determines that the reset request signal is sent from the second microcomputer 52. Then, the first reset request determining module 57 sets the first reset request flag Frq1 to Hi level while the format of the signal from the second microcomputer 52 matches the reset request format.

The second reset request determining module 58 is connected to the first microcomputer 51 via the above first reset request signal line and determines whether or not the reset request signal indicating that the second microcomputer 52 should be reset is sent to the monitoring unit 53 from the first microcomputer 51. The second reset request determining module 58 sets a second reset request flag Frq2 to Lo level when it determines that a format of the signal sent from the first microcomputer 51 via the first reset request signal line does not match a predetermined reset request format and the reset request signal is not sent from the first microcomputer 51. When the format of the signal sent from the first microcomputer 51 matches the reset request format, the second reset request determining module 58 determines that the reset request signal is sent from the first microcomputer 51. Then, the second reset request determining module 58 sets the second reset request flag Frq2 to Hi level while the format of the signal from the first microcomputer 51 matches the reset request format. The format of the reset request signal may be voluntarily defined.

The reset processing module 59 is capable of sending either a reset signal or a reset prohibition signal to each of the first and second microcomputers 51 and 52 in accordance with the states of the first and second microcomputers 51 and 52. As shown in FIG. 1, the reset processing module 59 includes a first reset processing module 59a programmed to set a first reset prohibition flag Frp1 corresponding to the first microcomputer 51, and a second reset processing module 59b programmed to set a second reset prohibition flag Frp2 corresponding to the second microcomputer 52. In the present embodiment, the reset processing module 59, that is, the first and second reset processing modules 59a and 59b are constructed by the third CPU of the monitoring unit 53 that executes programs stored in the ROM.

The first reset processing module 59a acquires the first watchdog monitoring flag Fw1 set by the first abnormality determining module 55, the first reset request flag Frq1 set by the first reset request determination module 57, and the second reset prohibition flag Frp2 set by the second reset processing module 59b and sets the first reset prohibition flag Frp1 to Hi or Lo level in accordance with levels of these flags. When the first reset prohibition flag Frp1 is set to Hi level, the reset prohibition signal of Hi level is sent to the first microcomputer 51 from the first reset processing module 59a (monitoring unit 53) so as to prohibit a reset of the first microcomputer 51. The first microcomputer 51 continues to operate without resetting itself when it receives the reset prohibition signal. On the other hand, when the first reset prohibition flag Frp1 is set to Lo level, the reset signal of Lo level is sent to the first microcomputer 51 from the first reset processing module 59a (monitoring unit 53). The first microcomputer 51 resets itself and stops its operation when it receives the reset signal.

The second reset processing module 59b acquires the second watchdog monitoring flag Fw2 set by the second abnormality determining module 56, the second reset request flag Frq2 set by the second reset request determination module 58, and the first reset prohibition flag Frp1 set by the first reset processing module 59a and sets the second reset prohibition flag Frp2 to Hi or Lo level in accordance with levels of these flags. When the second reset prohibition flag Frp2 is set to Hi level, the reset prohibition signal of Hi level is sent to the second microcomputer 52 from the second reset processing module 59b (monitoring unit 53) so as to prohibit a reset of the second microcomputer 52. The second microcomputer 52 continues to operate without resetting itself when it receives the reset prohibition signal. On the other hand, when the second reset prohibition flag Frp2 is set to Lo level, the reset signal of Lo level is sent to the second microcomputer 52 from the second reset processing module 59b (monitoring unit 53). The second microcomputer 52 resets itself and stops its operation when it receives the reset signal.

Figure 2:
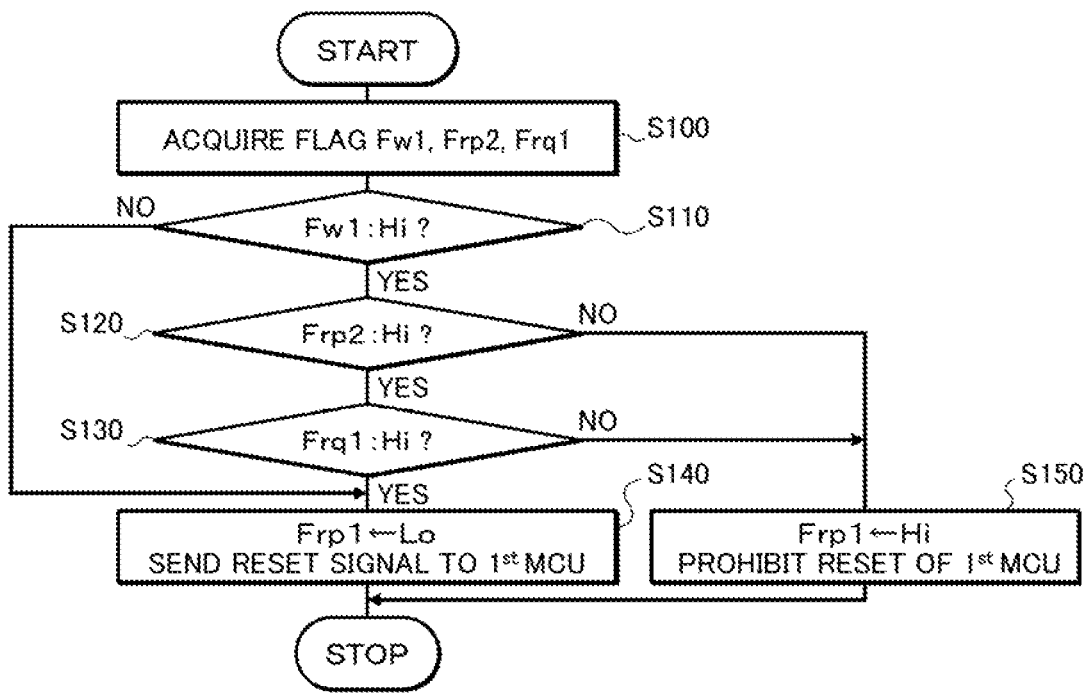
FIG. 2 is a flowchart exemplifying a first reset permissibility routine executed by the control apparatus according to the present disclosure.
Figure 3:
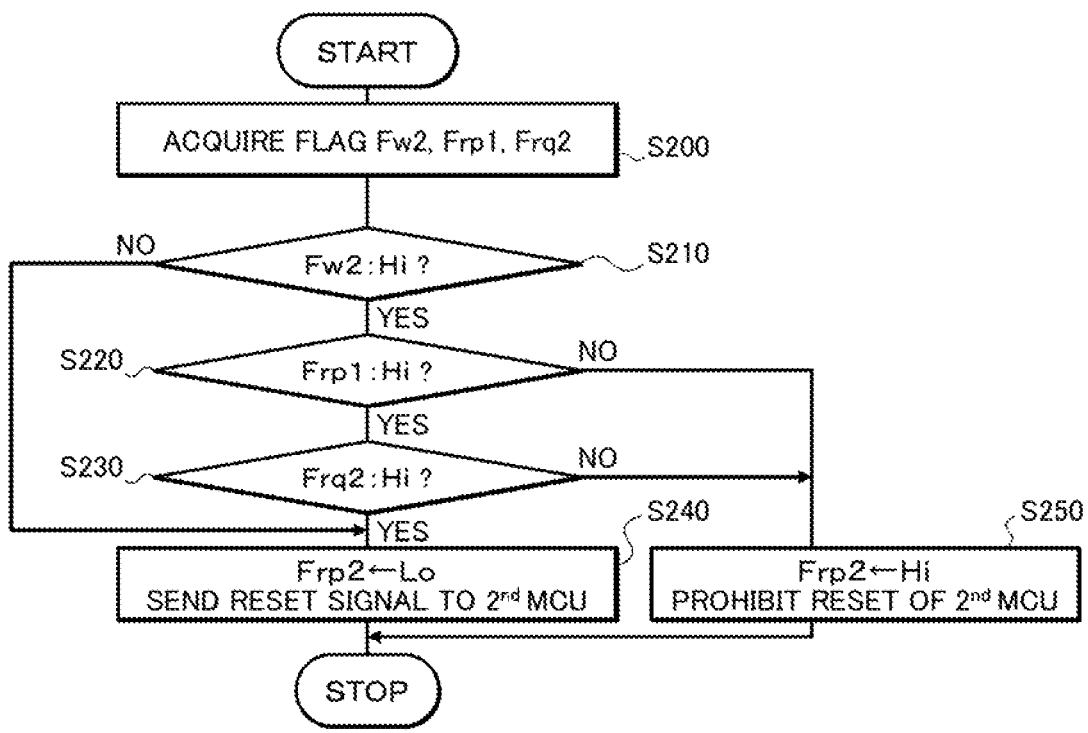
FIG. 3 is a flowchart exemplifying a second reset permissibility routine executed by the control apparatus according to the present disclosure.

The following describes reset procedures of the first and second microcomputers 51 and 52 by the monitoring unit 53 of the MGECU 50 with reference to FIGS. 2 and 3. FIG. 2 is a flowchart exemplifying a first reset permissibility routine executed by the first reset processing module 59a of the monitoring unit 53. FIG. 3 is a flowchart exemplifying a second reset permissibility routine executed by the second reset processing module 59b of the monitoring unit 53. The first and second reset permissibility routines are repeatedly executed at predetermined time intervals by the first or second reset processing module 59a or 59b while a system of the vehicle 1 is activated.

At a start of the first reset permissibility routine of FIG. 2, the first reset processing module 59a acquires the first watchdog monitoring flag Fw1, the second reset prohibition flag Frp2 and the first reset request flag Frq1 (Step S100).

Then, the first reset processing module 59a determines whether the first watchdog monitoring flag Fw1 is set to Hi level or not (Step S110). When determining that the first watchdog monitoring flag Fw1 is set to Hi level and no abnormality occurs in the first microcomputer 51 (Step S110: YES), the first reset processing module 59a determines whether or not the second reset prohibition flag Frp2 is set to the Hi level by the second reset processing module 59b (Step S120). When determining that the second reset prohibition flag Frp2 is set to Hi level and the second microcomputer 52 is not reset (Step S120: YES), the first reset processing module 59a determines whether the first reset request flag Frq1 is set to Hi level or not (Step S130).

When determining that the first reset request flag Frq1 is set to Hi level (Step S130: YES), the first reset processing module 59a sets the first reset prohibition flag Frp1 to the Lo level and sends the reset signal of Lo level to the first microcomputer 51 (Step S140). Then, the first reset processing module 59a temporarily terminates the first reset permissibility routine. As described above, the first microcomputer 51 resets itself and stops its operation when it receives the reset signal from the first reset processing module 59a (monitoring unit 53). That is, the first microcomputer 51 is reset in response to a request from the second microcomputer 52 when the watchdog pulse signal from the first microcomputer 51 is normal, but the reset of the first microcomputer 51 is requested by the second microcomputer 52 that is not reset and normally works (is considered to normally work).

When determining the first watchdog monitoring flag Fw1 is set to Lo level and the abnormality occurs in the first microcomputer 51 (Step S110: NO), the first reset processing module 59a sets the first reset prohibition flag Frp1 to Lo level irrespective of the levels of the second reset prohibition flag Frp2 and the first reset request flag Frq1 and sends the reset signal of the Lo level to the first microcomputer 51 (Step S140). Then, the first reset processing module 59a temporarily terminates the first reset permissibility routine. That is, when determined that the abnormality occurs in the first microcomputer 51 based on the watchdog pulse signal from the first microcomputer 51, the first microcomputer 51 is reset irrespective of the state of the second microcomputer 52.

On the other hand, when determining that the second reset prohibition flag Frp2 is set to Lo level and the reset signal is sent to the second microcomputer 52 from the second reset processing module 59b (Step S120: NO), the first reset processing module 59a sets the first reset prohibition flag Frp1 to Hi level so as to prohibit the reset of the first microcomputer 51 and sends the reset prohibition signal of Hi level to the first microcomputer 51 (Step S150). Then, the first reset processing module 59a temporarily terminates the first reset permissibility routine. That is, when the watchdog pulse signal from the first microcomputer 51 is normal, but the second microcomputer 52 requests the reset of the first microcomputer 51 while the reset signal is sent from the second reset processing module 59b, the reset of the first microcomputer 51 is prohibited irrespective of the request from the second microcomputer 52 and the first microcomputer 51 continues to operate. Thus, the reset of the normal first microcomputer 51 is suppressed even if the reset request signal indicating that the first microcomputer 51 should be reset is erroneously sent to the monitoring unit 53 from the second microcomputer 52 after an occurrence of the abnormality and before a completion of the reset of the second microcomputer 52.

Further, when determining that the first reset request flag Frq1 is set to Lo level (Step S130: NO), the first reset processing module 59a sets the first reset prohibition flag Frp1 to Hi level so as to prohibit the reset of the first microcomputer 51 and sends the reset prohibition signal of Hi level to the first microcomputer 51 (Step S150). Then, the first reset processing module 59a temporarily terminates the first reset permissibility routine. That is, when the watchdog pulse signal from the first microcomputer 51 is normal and the second microcomputer 52 does not request the reset of the first microcomputer 51, the reset of the first microcomputer 51 is prohibited and the first microcomputer 51 continues to operate.

The following describes the second reset permissibility routine shown in FIG. 3. At a start of the second reset permissibility routine, the second reset processing module 59b acquires the second watchdog monitoring flag Fw2, the first reset prohibition flag Frp1 and the second reset request flag Frq2 (Step S200). Then, the second reset processing module 59b determines whether the second watchdog monitoring flag Fw2 is set to Hi level or not (Step S210). When determining that the second watchdog monitoring flag Fw2 is set to Hi level and no abnormality occurs in the second microcomputer 52 (Step S210: YES), the second reset processing module 59b determines whether or not the first reset prohibition flag Frp1 is set to the Hi level by the first reset processing module 59a (Step S220). When determining that the first reset prohibition flag Frp1 is set to Hi level and the first microcomputer 51 is not reset (Step S220: YES), the second reset processing module 59b determines whether the second reset request flag Frq2 is set to Hi level or not (Step S230).

When determining that the second reset request flag Frq2 is set to Hi level (Step S230: YES), the second reset processing module 59b sets the second reset prohibition flag Frp2 to the Lo level and sends the reset signal of Lo level to the second microcomputer 52 (Step S240). Then, the second reset processing module 59b temporarily terminates the second reset permissibility routine. As described above, the second microcomputer 52 resets itself and stops its operation when it receives the reset signal from the second reset processing module 59b (monitoring unit 53). That is, the second microcomputer 52 is reset in response to a request from the first microcomputer 51 when the watchdog pulse signal from the second microcomputer 52 is normal, but the reset of the second microcomputer 52 is requested by the first microcomputer 51 that is not reset and normally works (is considered to normally work).

When determining the second watchdog monitoring flag Fw2 is set to Lo level and the abnormality occurs in the second microcomputer 52 (Step S210: NO), the second reset processing module 59b sets the second reset prohibition flag Frp2 to Lo level irrespective of the levels of the first reset prohibition flag Frp1 and the second reset request flag Frq2 and sends the reset signal of the Lo level to the second microcomputer 52 (Step S240). Then, the second reset processing module 59b temporarily terminates the second reset permissibility routine. That is, when determined that the abnormality occurs in the second microcomputer 52 based on the watchdog pulse signal from the second microcomputer 52, the second microcomputer 52 is reset irrespective of the state of the first microcomputer 51.

On the other hand, when determining that the first reset prohibition flag Frp1 is set to Lo level and the reset signal is sent to the first microcomputer 51 from the first reset processing module 59a (Step S220: NO), the second reset processing module 59b sets the second reset prohibition flag Frp2 to Hi level so as to prohibit the reset of the second microcomputer 52 and sends the reset prohibition signal of Hi level to the second microcomputer 52 (Step S250). Then, the second reset processing module 59b temporarily terminates the second reset permissibility routine. That is, when the watchdog pulse signal from the second microcomputer 52 is normal, but the first microcomputer 51 requests the reset of the second microcomputer 52 while the reset signal is sent from the first reset processing module 59a, the reset of the second microcomputer 52 is prohibited irrespective of the request from the first microcomputer 51 and the second microcomputer 52 continues to operate. Thus, the reset of the normal second microcomputer 52 is suppressed even if the reset request signal indicating that the second microcomputer 52 should be reset is erroneously sent to the monitoring unit 53 from the first microcomputer 51 after an occurrence of the abnormality and before a completion of the reset of the first microcomputer 51.

Further, when determining that the second reset request flag Frq2 is set to Lo level (Step S230: NO), the second reset processing module 59b sets the second reset prohibition flag Frp2 to Hi level so as to prohibit the reset of the second microcomputer 52 and sends the reset prohibition signal of Hi level to the second microcomputer 52 (Step S250). Then, the second reset processing module 59b temporarily terminates the first reset permissibility routine. That is, when the watchdog pulse signal from the second microcomputer 52 is normal and the first microcomputer 51 does not request the reset of the second microcomputer 52, the reset of the second microcomputer 52 is prohibited and the second microcomputer 52 continues to operate.

As described above, the monitoring unit 53 of the MGECU 50 sends the reset signal to one of the first and second microcomputers 51 and 52 on condition that it does not send the reset signal to the other of the first and second microcomputers 51 and 52 when the monitoring unit 53 receives the reset request signal indicating that one of the first and second microcomputers 51 and 52 should be reset from the other of the first and second microcomputers 51 and 52 (Steps S120-S140 in FIG. 2, Steps S220-S240 in FIG. 3). That is, even if the reset request signal indicating that one of the first and second microcomputers 51 and 52 should be reset is sent from the other of the first and second microcomputers 51 and 52 to the monitoring unit 53, the reset of the one of the first and second microcomputers 51 and 52 is prohibited when the monitoring unit 53 sends the reset signal to the other of the first and second microcomputers 51 and 52 (Step S150 in FIG. 2, Step S250 in FIG. 3). Thus, the reset of the normal one of the first and second microcomputers 51 and 52 is suppressed when the one of the first and second microcomputers 51 and 52 normally operates and the abnormality occurs in the other.

Further, the monitoring unit 53 includes the first abnormality determining module 55 that determines whether or not the abnormality occurs in the first microcomputer 51 based on the watchdog pulse signal form the first microcomputer 51, the second abnormality determining module 56 that determines whether or not the abnormality occurs in the second microcomputer 52 based on the watchdog pulse signal form the second microcomputer 52, and the reset processing module 59. The reset processing module 59 includes the first reset processing module 59a corresponding to the first microcomputer 51 and the second reset processing module 59b corresponding to the second microcomputer 52. The first reset processing module 59a sends the reset signal to the first microcomputer 51 when the first abnormality determining module 55 determines that the abnormality occurs in the first microcomputer 51 and when the reset request signal indicating that the first microcomputer 51 should be reset is sent to the monitoring unit 53 from the second microcomputer 52 and the reset signal is not sent to the second microcomputer 52. The second reset processing module 59b sends the reset signal to the second microcomputer 52 when the second abnormality determining module 56 determines that the abnormality occurs in the second microcomputer 52 and when the reset request signal indicating that the second microcomputer 52 should be reset is sent to the monitoring unit 53 from the first microcomputer 51 and the reset signal is not sent to the first microcomputer 51. This configuration enables the first and second microcomputers 51 and 52 to be independently monitored by the first and second abnormality determining modules 55 and 56, such that the reset of both the first and second microcomputers 51 and 52 is favorably suppressed when the abnormality occurs in any one of the first and second microcomputers 51 and 52.

In the above embodiment, the monitoring unit 53 is a single microcomputer and at least a part of functions of the monitoring unit 53 or the reset processing module 59 are executed using software. Thus, a development lead time or development costs of the MGECU 50 including the monitoring unit 53 is reduced. The MGECU 50 may be provided with a multi-core processor instead of the three microcomputers. That is, the MGECU 50 may include the multi-core processor performs functions of the processor of the first microcomputer 51, the processor of the second microcomputer 52 and the processor of the monitoring unit 53.

Figure 4:
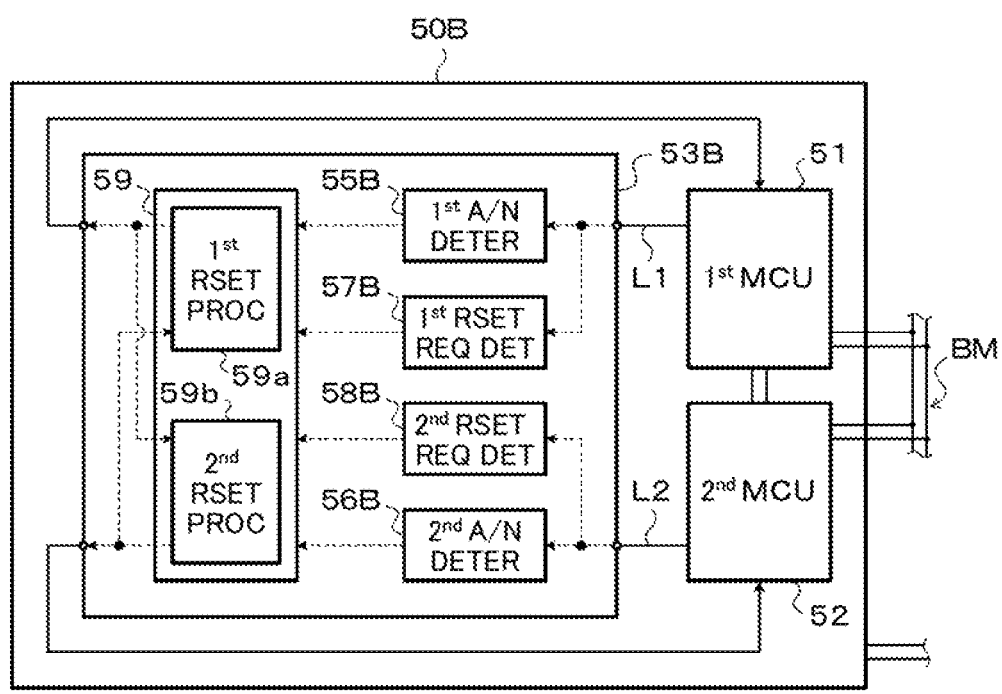
FIG. 4 is a block diagram illustrating another control apparatus according to the present disclosure.

FIG. 4 is a block diagram illustrating a MGECU 50B or another control apparatus according to the present disclosure. Among components of the MGECU 50B, the same components to those of the MGECU 50 described above are expressed by the same reference signs and their repeated descriptions are omitted.

In the MGECU 50B shown in FIG. 4, instead of the watchdog pulse signal, a predetermined signal is periodically sent to a monitoring unit 53B from the first microcomputer 51 via a first communication line L1. Further, instead of the watchdog pulse signal, a predetermined signal is periodically sent to the monitoring unit 53B from the second microcomputer 52 via a second communication line L2. The monitoring unit 53B includes a first abnormality determining module 55B that determines whether or not the abnormality occurs in the first microcomputer 51 based on the signal periodically sent to the monitoring unit 53B from the first microcomputer 51 via the first communication line L1, and a second abnormality determining module 56B that determines whether or not the abnormality occurs in the second microcomputer 52 based on a signal periodically sent to the monitoring unit 53B from the second microcomputer 52 via the second communication line L2.

The first and second abnormality determining modules 55B and 56B respectively monitor a communication cycle of the signal periodically sent from the first or second microcomputer 51 or 52. Each of the first and second abnormality determining modules 55B and 56B sets the first or second watchdog monitoring flag Fw1 or Fw2 to the Hi (high) level when it determines that the communication cycle matches a predetermined reference cycle and no abnormality occurs in the first or second microcomputer 51 or 52. Further, each of the first and second abnormality determining modules 55B and 56B sets the first or second watchdog monitoring flag Fw1 or Fw2 to the Lo (low) level when it determines that the communication cycle does not match the reference cycle and the abnormality occurs in the first or second microcomputer 51 or 52.

In the MGECU 50B, the first microcomputer 51 sends the reset request signal indicating that the second microcomputer 52 should be reset to the monitoring unit 53B via the first communication line L1. The second microcomputer 52 sends the reset request signal indicating that the first microcomputer 51 should be reset to the monitoring unit 53B via the second communication line L2. Further, first and second reset request determining modules 57B and 58B of the monitoring unit 53B receive the reset request signal sent to the monitoring unit 53B via the first or second communication line L1, L2 and communication lines in the monitoring unit 53B and execute same processing as the above first and second reset request determination modules 57 and 58. The MGECU 50B enables a communication line for sending the reset request signal from the first microcomputer 51 to the monitoring unit 53B and a communication line for sending the reset request signal from the second microcomputer 52 to the monitoring unit 53B to be omitted. Accordingly, reliability of the MGECU 50B is favorably improved by reducing a risk of an occurrence of a communication line abnormality.

Figure 5:
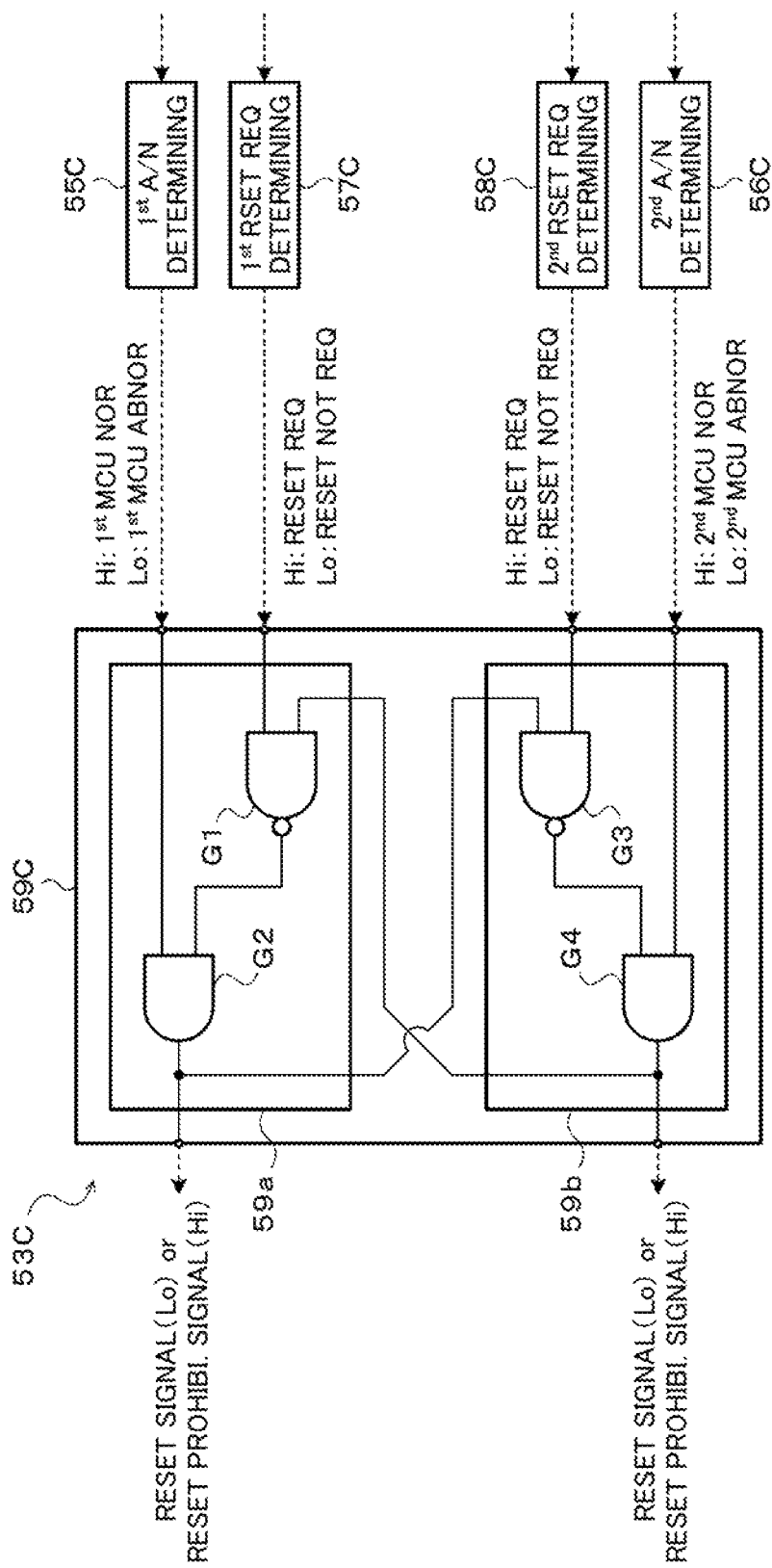
FIG. 5 is a block diagram illustrating another monitoring module adaptable to the control apparatus according to the present disclosure.

FIG. 5 is a block diagram illustrating another monitoring unit 53C adaptable to the control apparatus according to the present disclosure.

In the monitoring units 53c shown in FIG. 5, each of first and second abnormality determining modules 55C and 56C outputs a signal of Hi level when it determines that the watchdog pulse signal from the first or second microcomputer 51 or 52 is not interrupted for a predetermined time or more and no abnormality occurs in the first or second microcomputer 51 or 52. Further, each of the first and second abnormality determining module 55C and 56C outputs a signal of Lo level when it determines that the watchdog pulse signal from the first or second microcomputer 51 or 52 is interrupted for the predetermined time or more and the abnormality occurs in the first or second microcomputer 51 or 52. In the monitoring unit 53C, each of first and second reset request determining module 57C and 58C outputs a signal of Lo level when it determines that the format of the signal sent from the first or second microcomputer 51 or 52 does not match a predetermined reset request format and the reset request signal is not sent from the first or second microcomputer 51 or 52. When the format of the signal sent from the first or second microcomputer 51 or 52 matches the reset request format, the first and second reset request determining modules 57C and 58C determine that the reset request signal is sent from the first or second microcomputer 51 or 52. Then, the first and second reset request determining module 57C and 58C output a signal of Hi level while the format of the signal from the first or second microcomputer 51 or 52 matches the reset request format.

In the monitoring unit 53C, the first reset processing module 59a of a reset processing module 59C is configured of a logic circuit including a NAND gate G1 and an AND gate G2. The second reset processing module 59b of the reset processing module 59C is configured of a logic circuit including a NAND gate G3 and an AND gate G4. The NAND gate G1 of the first reset processing module 59a receives the signal from the first reset request determining module 57C and an output signal of the second reset processing module 59b (AND gate G4), that is, the reset prohibition signal of Hi level or the reset signal of Lo level. The NAND gate G1 outputs a signal of Lo level only when Levels of both the signal from first reset request determining module 57C and the output signal of second reset processing module 59b (AND gate G4) are Hi level. Otherwise, the NAND gate G1 outputs a signal of Hi level. The AND gate G2 of the first reset processing module 59a receives the signal from the first abnormality determining module 55C and the output signal of the NAND gate G1. The AND gate G2 outputs the reset prohibition signal of Hi level only when levels of both the signal from the first abnormality determining module 55C and the output signal of the NAND gate G1 are Hi level. Otherwise, the AND gate G2 outputs the reset signal of Lo level.

The NAND gate G3 of the second reset processing module 59b receives the signal from the second reset request determining module 58C and an output signal of the first reset processing module 59a (AND gate G2), that is, the reset prohibition signal of Hi level or the reset signal of Lo level. The NAND gate G3 outputs a signal of Lo level only when Levels of both the signal from second reset request determining module 58C and the output signal of first reset processing module 59a (AND gate G2) are Hi level. Otherwise, the NAND gate G3 outputs a signal of Hi level. The AND gate G4 of the second reset processing module 59b receives the signal from the second abnormality determining module 56C and the output signal of the NAND gate G3. The AND gate G4 outputs the reset prohibition signal of Hi level only when levels of both the signal from the second abnormality determining module 56C and the output signal of the NAND gate G3 are Hi level. Otherwise, the AND gate G4 outputs the reset signal of Lo level.

FIG. 6 shows a truth table of the logic circuit that configures the first reset processing module 59a of the monitoring unit 53C. FIG. 7 shows a truth table of the logic circuit that configures the second reset processing module 59b of the monitoring unit 53C. As seen from these figures, same advantages as those of the above MGECU 50 can be obtained in the MGECU 50C including the monitoring unit 53C. The monitoring unit 53C may be configured by an ASIC so as to include the first and second reset processing module 59a and 59b respectively configured of the logic circuit. This configuration enables a cost (price) of the MGECU 50C including the monitoring unit 53C to be reduced. The logic circuits for the first and second reset processing module 59a and 59b are not limited to the above-described circuits. The monitoring unit 53C may be adapted to the the MGECU 50B.

The above first microcomputer 51, the second microcomputer 52, and the monitoring unit (third microcomputer) 53 or 53B of the MGECU 50 or 50B are included in the same ECU, but not limited thereto. That is, the first microcomputer 51, the second microcomputer 52 and the monitoring unit (third microcomputer) 53 or 53B may be distributed to three different ECUs. Thus, the invention of the present disclosure may be applied to an ECU that controls a first equipment, an ECU that controls the first equipment or a second equipment different from the first equipment, and an ECU that includes a monitoring unit. Each of the MGECUs 50, 50B and 50C includes the first microcomputer 51 that controls the motor generator MG1 and the second microcomputer 52 that controls the motor generator MG2 that is different from the motor generator MG1, but not limited thereto. That is, the first and second microcomputers 51 and 52 may control an identical equipment. Further, the vehicle including the control apparatus of the present disclosure may be a one-motor hybrid vehicle, a series hybrid vehicle, a plug-in hybrid vehicle, an electric vehicle, or a vehicle including only an engine (internal combustion engine) as a driving power source.

As has been described above, a control apparatus of the present disclosure includes a first control module configured to control a first equipment, a second control module configured to control the first equipment or a second equipment different from the first equipment, and a monitoring module configured to monitor the first and second control modules and to send a reset signal to each of the first and second control modules. The first and second control modules mutually monitor a state of the other end and send a reset request signal to the monitoring module when the other end should be reset. The monitoring module sends the reset signal to one of the first and second control modules when the monitoring module receives the reset request signal indicating that the one of the first and second control modules should be reset from the other of the first and second control modules and the monitoring module does not send the reset signal to the other of the first and second control modules. The monitoring module prohibits a reset of one of the first and second control modules when the monitoring module receives the reset request signal indicating that the one of the first and second control modules should be reset from the other of the first and second control modules and the monitoring module sends the reset signal to the other of the first and second control modules.

The monitoring module of the control apparatus of the present disclosure sends the reset signal to one of the first and second control modules on condition that the monitoring module does not send the reset signal to the other of the first and second control modules when the monitoring module receives the reset request signal indicating that the one of the first and second control modules should be reset from the other of the first and second control modules. That is, even if the reset request signal indicating that the one of the first and second control modules should be reset is transmitted from the other of the first and second control modules to the monitoring module, the reset of the one of the first and second control modules is prohibited when the monitoring module sends the reset signal to the other of the first and second control modules. Thus, the control apparatus suppresses the normal one of the first and second control modules to be reset when the one of the first and second control modules normally operates and an abnormality occurs in the other.

The monitoring module may include a first abnormality determining module configured to determine whether or not an abnormality occurs in the first control module based on a signal from the first control module, a second abnormality determining module configured to determine whether or not an abnormality occurs in the second control module based on a signal from the second control module, a first reset processing module configured to send the reset signal to the first control module when the first abnormality determining module determines that the abnormality occurs in the first control module and when the reset request signal indicating that the first control module should be reset is sent to the monitoring module from the second control module and the reset signal is not sent to the second control module, and a second reset processing module configured to send the reset signal to the second control module when the second abnormality determining module determines that the abnormality occurs in the second control module and when the reset request signal indicating that the second control module should be reset is sent to the monitoring module from the first control module and the reset signal is not sent to the first control module. This enables the first and second control modules to be independently monitored by the first and second abnormality determining modules, such that the reset of both the first and second control modules is favorably suppressed when the abnormality occurs in any one of the first and second control modules.

The monitoring module may include a first reset request determining module configured to determine whether or not the reset request signal indicating that the second control module should be reset is sent to the monitoring module from the first control module, and a second reset request determining module configured to determine whether or not the reset request signal indicating that the first control module should be reset is sent to the monitoring module from the second control module.

Each of the signal sent to the first abnormality determining module from the first control module and the signal sent to the second abnormality determining module from the second control module may be a watchdog pulse signal.

The first abnormality determining module may determine whether or not the abnormality occurs in the first control module based on a signal periodically sent to the monitoring module from the first control module via a first communication line. The second abnormality determining module may determine whether or not the abnormality occurs in the second control module based on a signal periodically sent to the monitoring module from the second control module via a second communication line. The first control module may send the reset request signal indicating that the second control module should be reset to the monitoring module via the first communication line. The second control module may send the reset request signal indicating that the first control module should be reset to the monitoring module via the second communication line. This configuration enables a communication line for sending the reset request signal from the first control module to the monitoring module and a communication line for sending the reset request signal from the second control module to the monitoring module to be omitted and favorably improves reliability of the control apparatus by reducing a risk of an occurrence of a communication line abnormality.

The monitoring module may be configured by an ASIC. This enables a cost of the control apparatus including the monitoring module to be reduced.

The monitoring module may be a single microcomputer. That is, at least a part of functions of the monitoring module may be executed using software, such that a development lead time or development costs of the control apparatus including the monitoring module is reduced.

A multi-core processor may perform functions of a processor of the first control module, a processor of the second control module and a processor of the monitoring module.

A reset method of the present disclosure is a reset method of a control apparatus that includes a first control module configured to control a first equipment and a second control module configured to control the first equipment or a second equipment different from the first equipment, the first and second control modules mutually monitoring a state of the other end and output a reset request signal when the other end should be reset. The method includes sending the reset signal to one of the first and second control modules when the other of the first and second control modules outputs the reset request signal indicating that the one of the first and second control modules should be reset and the reset signal is not sent to the other of the first and second control modules, and prohibiting a reset of one of the first and second control modules when the other of the first and second control modules outputs the reset request signal indicating that the one of the first and second control modules should be reset and the reset signal is sent to the other of the first and second control modules.

The method suppresses the normal one of the first and second control modules to be reset when the one of the first and second control modules normally operates and an abnormality occurs in the other.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the control apparatus.

The invention claimed is:

1. A control apparatus that includes a first control module configured to control a first equipment, and a second control module configured to control the first equipment or a second equipment different from the first equipment, the first and second control modules mutually monitoring a state of an end and outputting a reset request signal when the end should be reset, the control apparatus comprising:
a monitoring module configured to receive the reset signals from both the first and second control modules so as to monitor the first and second control modules and to send a reset signal to each of the first and second control modules, the monitoring module sending the reset signal to one of the first and second control modules when the monitoring module receives the reset request signal indicating that the one of the first and second control modules should be reset from the other of the first and second control modules and the monitoring module not sending the reset signal to the other of the first and second control modules, and the monitoring module prohibiting a reset of one of the first and second control modules when the monitoring module receives the reset request signal indicating that the one of the first and second control modules should be reset from the other of the first and second control modules and the monitoring module sending the reset signal to the other of the first and second control modules.

2. The control apparatus according to claim 1,
wherein the monitoring module includes:
a first abnormality determining module configured to determine whether or not an abnormality occurs in the first control module based on a signal from the first control module;
a second abnormality determining module configured to determine whether or not an abnormality occurs in the second control module based on a signal from the second control module;
a first reset processing module configured to send the reset signal to the first control module when the first abnormality determining module determines that the abnormality occurs in the first control module and when the reset request signal indicating that the first control module should be reset is sent to the monitoring module from the second control module and the reset signal is not sent to the second control module; and
a second reset processing module configured to send the reset signal to the second control module when the second abnormality determining module determines that the abnormality occurs in the second control module and when the reset request signal indicating that the second control module should be reset is sent to the monitoring module from the first control module and the reset signal is not sent to the first control module.

3. The control apparatus according to claim 2,
wherein the monitoring module includes:
a first reset request determining module configured to determine whether or not the reset request signal indicating that the second control module should be reset is sent to the monitoring module from the first control module; and
a second reset request determining module configured to determine whether or not the reset request signal indicating that the first control module should be reset is sent to the monitoring module from the second control module.

4. The control apparatus according to claim 3,
wherein the first abnormality determining module determines whether or not the abnormality occurs in the first control module based on a signal periodically sent to the monitoring module from the first control module via a first communication line,
wherein the second abnormality determining module determines whether or not the abnormality occurs in the second control module based on a signal periodically sent to the monitoring module from the second control module via a second communication line,
wherein the first control module sends the reset request signal indicating that the second control module should be reset to the monitoring module via the first communication line, and
wherein the second control module sends the reset request signal indicating that the first control module should be reset to the monitoring module via the second communication line.

5. The control apparatus according to claim 2,
wherein each of the signal sent to the first abnormality determining module from the first control module and the signal sent to the second abnormality determining module from the second control module is a watchdog pulse signal.

6. The control apparatus according to claim 2,
wherein the monitoring module is configured by an ASIC.

7. The control apparatus according to claim 1,
wherein the monitoring module is a single microcomputer.

8. The control apparatus according to claim 1,
wherein a multi-core processor performs functions of a processor of the first control module, a processor of the second control module and a processor of the monitoring module.

9. A reset method of a control apparatus that includes a first control module configured to control a first equipment and a second control module configured to control the first equipment or a second equipment different from the first equipment and a monitoring module configured to monitor the first and second control modules and to send a reset signal to each of the first and second control modules, the first and second control modules mutually monitoring a state of an end and sending a reset request signal to the monitoring module when the end should be reset, the method comprising:
sending the reset signal from the monitoring module to one of the first and second control modules when the other of the first and second control modules outputs sends the reset request signal indicating that the one of the first and second control modules should be reset to the monitoring module and the reset signal is not sent to the other of the first and second control modules from the monitoring module, and prohibiting a reset of one of the first and second control modules when the other of the first and second control modules sends the reset request signal indicating that the one of the first and second control modules should be reset to the monitoring module and the reset signal is sent to the other of the first and second control modules from the monitoring module.

* * * * *